G. MACARDLE.
Dust Pan.
No. 237,115. Patented Feb. 1, 1881.
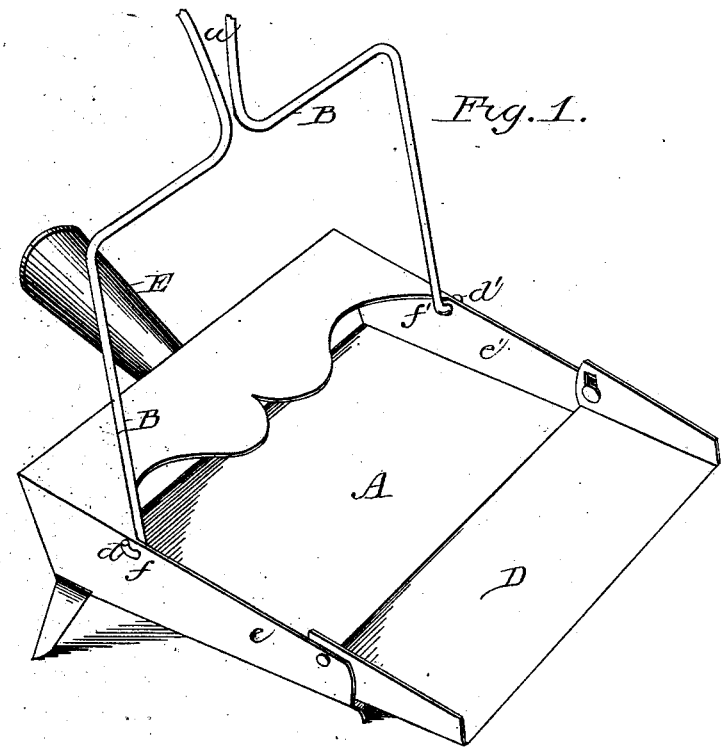
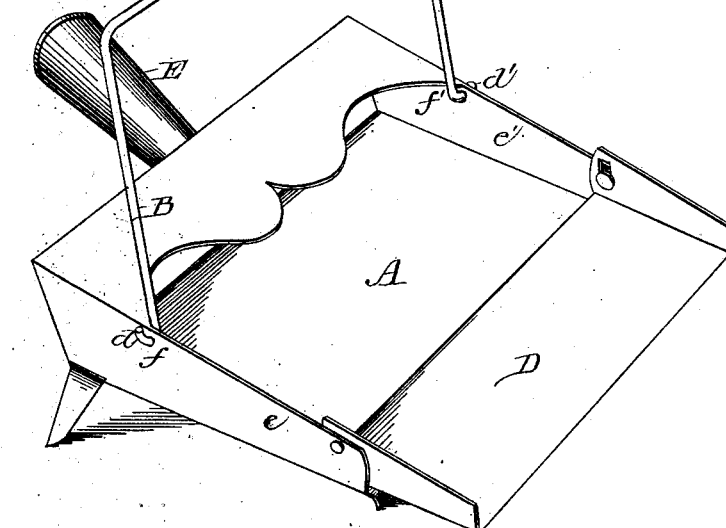
Witnesses: Inventor:
O B Knowlton George Macardle
W P Macardle

UNITED STATES PATENT OFFICE.

GEORGE MACARDLE, OF PECATONICA, ILLINOIS.

DUST-PAN.

SPECIFICATION forming part of Letters Patent No. 237,115, dated February 1, 1881.

Application filed July 24, 1878.

*To all whom it may concern:*

Be it known that I, GEORGE MACARDLE, of Pecatonica, in the county of Winnebago and State of Illinois, have invented a new and useful Improvement in Dust-Pans, which improvement is fully set forth in the following specification, reference being had to the accompanying drawings.

The nature of my invention consists in combining a wire bail with a dust-pan.

Figures 1 and 2 are perspective views of my improvement in dust-pans.

In each of the figures, A represents a dust-pan, and B B a wire bail which spans across the main body of the dust-pan, with its central part formed into a loop, $a$, so as to make a convenient handle, and having its ends $d$ $d'$ hooked into the opposite sides, $e$ $e'$, of the pan at $f f'$, so that it may be turned from an upright position, as seen in Fig. 1, to that of a horizontal position, as shown by Fig. 2.

The advantage in attaching this wire bail to a dust-pan is, that greater convenience may be obtained for placing a dust-pan upon and lifting it off from the floor C C.

I do not confine my invention to any particular form of the wire bail B B, so long as it spans across the body of the dust-pan and its ends $d$ $d'$ are hooked into the opposite sides $e$ $e'$, as shown in Figs. 1 and 2.

This wire bail may be attached, as above described, to any dust-pan without invalidating the general and essential features of my invention.

Now, when it is desirable to use this improvement, and if it be attached to a dust-pan having a drop-apron, D, as represented by Figs. 1 and 2, the wire bail B B is turned backward to an upright position to the pan A, as shown by Fig. 1, and the free end of the drop-apron D is thrown out of the dust-pan, the hand grasping the loop part $a$. The dust-pan may be very readily reached to and placed upon the floor C C, as represented by Fig. 1, without bending the knees of the person using the dust-pan and without much stooping over, which decreases the labor of handling the dust-pan, and it may be shifted about and over the floor C C with much greater ease and convenience.

By the use of this attachment B B to a dust-pan the pan may be lifted off from and again replaced upon the floor without the inconvenience of stooping as far over as is necessary in the case where there is only a lower handle on the back of the dust-pan, as seen at E, Figs. 1 and 2.

When the pan is not in use the wire bail B B is thrown forward down into the dust-pan, and, as in the case of the one herein mentioned and represented by the annexed drawings, the drop-apron D is first thrown over into the body A of the pan, and then the wire bail B B is turned horizontally down into the pan over the drop-apron D and resting on the flange $g$ $g'$, as shown in Fig. 2, and in this compacted condition it may be hung up by the loop part $a$ in a convenient place.

I claim as my invention—

The combination of a wire bail, B B, with a dust-pan, A, for the purpose herein set forth, and substantially as described.

GEORGE MACARDLE.

Witnesses:
   Z. A. TRULL,
   A. W. DAY.